Oct. 14, 1969　　　L. R. LETZ　　　3,471,968
ADJUSTABLE TELESCOPING PLANT SUPPORT AND WATERING DEVICE
Filed Aug. 18, 1967
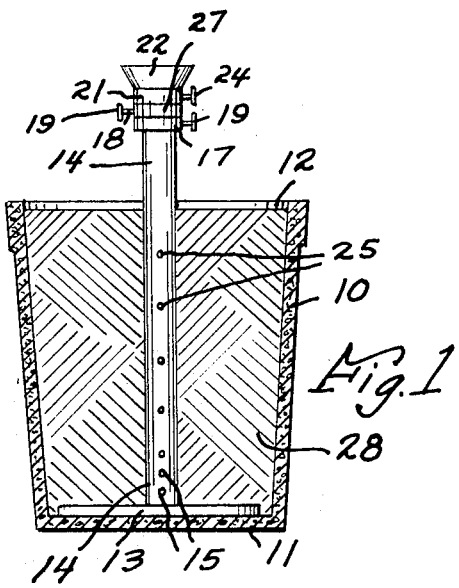
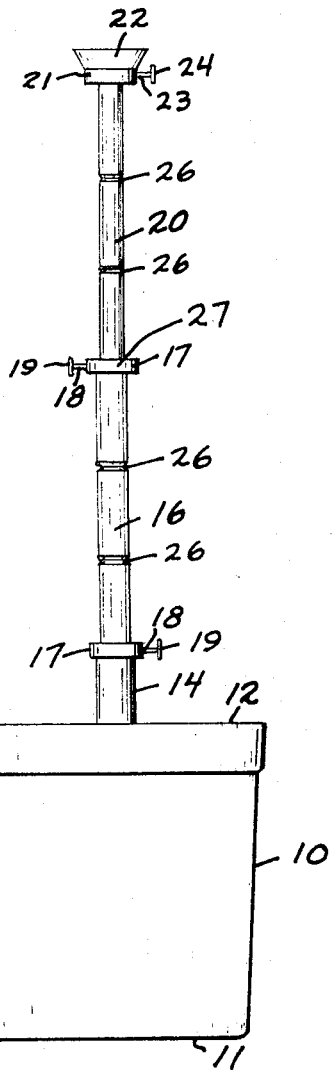
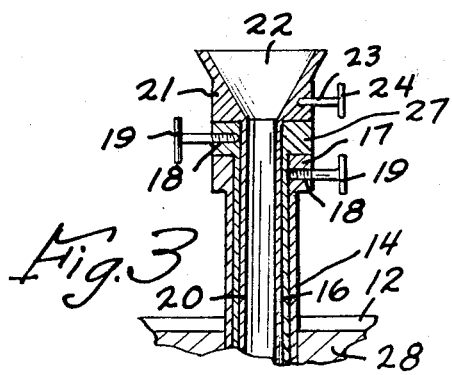
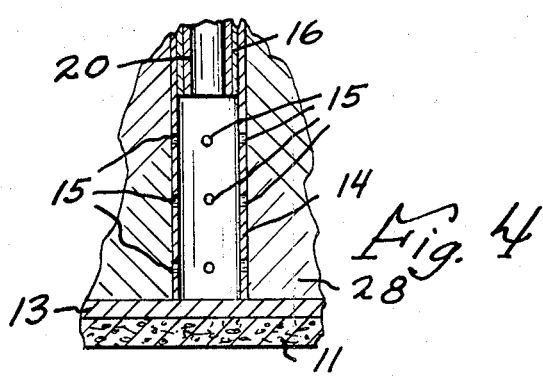
INVENTOR.
Larry R. Letz
BY
ATTORNEY

United States Patent Office 3,471,968
Patented Oct. 14, 1969

3,471,968
ADJUSTABLE TELESCOPING PLANT SUPPORT AND WATERING DEVICE
Larry R. Letz, 808 4th Ave., Sheldon, Iowa 51201
Filed Aug. 18, 1967, Ser. No. 661,677
Int. Cl. A01g 17/14; A47g 29/00
U.S. Cl. 47—47                                        1 Claim

ABSTRACT OF THE DISCLOSURE

A telescoping plant support and watering device adapted to be placed in the open ground or in a flower pot, and being adjustable to the height of a growing plant.

---

A combination plant support and watering device for potted plants having a telescoped stem providing for adjustment of the device as the plant grows. The watering device filters the water to the base of the plant beneath the top surface of the soil in the pot.

My invention relates to a device for supporting plants in pots or in other environments and will also operate to distribute water evenly about the plant.

An object of my invention is to provide such a device which can also be lengthened as desired to support the plant as it grows.

A further object of my invention is to provide certain other features which will provide other advantages as well.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a cross section of a pot showing my device therein,

FIGURE 2 is a side elevation of the same except that the telescoping sections are extended vertically, FIGURE 3 is an enlarged detail sectional view of the upper end of the arrangement, and FIGURE 4 is an enlarged sectional detail of the bottom of the arrangement.

My invention contemplates the provision of a telescoping support arrangement which can be extended as desired during the growth of a plant or plants, to support the same and which can be additionally used as a means for uniformly distributing water about the plant roots.

In describing my invention, I have used the character 10 to designate a flower pot made of the usual material, it being understood however that my invention can be used in any other desired arrangement, the character 11 indicating the bottom of the pot and the character 12 the open upper end.

I have further used the character 13 to indicate a circular plate to which is attached the outer cylindrical tube 14 having a series of closely spaced openings 15 at the bottom thereof, and telescopically engaged with the tube 14 is a further inner tube 16 having the shoulder portion 17 with which is threadably engaged the stud 18 terminating in the transverse bar 19, and telescopically engaged with the inner tube 16 is a further inner tube 20 having the expanded portion 21 in which is provided the upper substantially cone-shaped funnel 22, and attached at 23 to the portion 21 is a further substantially T-shaped member 24.

The outer tube 14 also includes a series of vertically spaced upper openings 25 (see FIGURE 1). The tubes 16 and 20 includes the peripheral grooves 26.

The tube 16 also includes a shoulder portion 27 with which is threadably engaged a similar stud 18 and portion 19.

The device is used in the following manner. The plate 13 is placed upon the bottom wall 11 of the pot 10 and the various other members will appear as shown in FIGURE 1, and then the soil 28 is placed in the pot which will rest upon the plate 13, and the weight of the soil will thereby firmly hold the arrangement against tipping or against becoming displaced. The plant is then placed in the soil.

Water is poured through the funnel 22 which will gravitate through the lower openings 15 and thence into the soil and will thoroughly moisten the same as desired.

As the plant or plants in the pot grow, first the inner tube 20 which carries the funnel 22 is raised to any desired distance, and then the upper member 18, 19 is used to secure the tube in this raised position by preferably turning the stud 18 until the end thereof engages one of the peripheral grooves 26 to thereby securely hold the tube. To still further extend the arrangement, the next inner tube 16 can be raised and supported in the same manner by means of the lower members 18, 19 so that as a result the support will function at any desired vertical height, and the funnel will always be in place so that the water can be poured in the same, and after the tube 16 is raised the upper openings 25 will permit passage of the water into the soil, although the lower openings 15 will usually be sufficient.

The portions 19 and 24 provide means whereby the plant can be supported at any height by merely slightly twisting the plant about these members, it being understood of course that any other type of securing arrangement can be used as well. Any number of telescoping sections can be employed, if it is desired to accommodate greater plant heights etc., and the telescoping sections can be made of plastic or any other material as desired. The units could also be used in a garden, for instance, by merely placing the plate 13 and the attendant structure in a pre-formed hole and then filling with dirt.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:
1. An adjustable plant support and watering device comprising a plurality of tubular telescoping concentric sections, the lowest one of said actions being secured to a base member adapted to be placed within a plant pot on the bottom wall thereof to position said sections in a vertical manner in axial alignment with said pot, said lowest section having openings therethrough to provide fluid communication between all of said sections and the pot interior, the upper ends of certain of said sections having securing studs and plant securing means attached to said studs, certain of said sections having peripheral grooves for receiving said studs, and the uppermost sec- tion having a funnel at the top thereof to facilitate the addition of water thereto.

References Cited

UNITED STATES PATENTS

| 2,809,468 | 10/1957 | Eliot | 47—44 |
| 2,990,647 | 7/1961 | Himebaugh | 47—47 |
| 3,165,863 | 1/1965 | Duran | 47—47 |
| 3,166,869 | 1/1965 | Luper | 47—47 |

FOREIGN PATENTS

| 584,043 | 10/1958 | Italy. |
| 278,851 | 2/1952 | Switzerland. |

ROBERT E. BAGWILL, Primary Examiner

U.S. Cl. X.R.

248—125